United States Patent [19]
Giles et al.

[11] Patent Number: 5,978,053
[45] Date of Patent: Nov. 2, 1999

[54] CHARACTERIZATION OF COLLIMATION AND BEAM ALIGNMENT

[75] Inventors: Michael K. Giles, Las Cruces, N.Mex.; Sean M. Doyle, Melbourne Beach, Fla.; Narashimha Prasad, Lafayette, Colo.

[73] Assignee: New Mexico State University Technology Transfer Corporation, Las Cruces, N.Mex.

[21] Appl. No.: 08/799,981

[22] Filed: Feb. 12, 1997

Related U.S. Application Data

[63] Continuation-in-part of application No. 08/499,703, Jul. 7, 1995, Pat. No. 5,684,545
[60] Provisional application No. 60/011,544, Feb. 13, 1996.
[51] Int. Cl.⁶ .............................. G01J 1/20; G02B 27/62
[52] U.S. Cl. .................. 349/17; 250/252.1; 250/559.35; 250/550; 250/201.3; 250/201.9; 356/359; 359/900; 359/638
[58] Field of Search ...................... 349/17, 200; 354/901, 354/368, 370, 376, 382, 385, 900, 11; 250/201.3, 201.9, 550, 554, 559.35, 229, 252.1; 348/79; 356/388, 359, 360, 139.04, 121, 122; 318/640

[56] References Cited

U.S. PATENT DOCUMENTS

| | | |
|---|---|---|
| 4,340,304 | 7/1982 | Massie . |
| 4,399,356 | 8/1983 | Feinleib et al. . |
| 4,670,646 | 6/1987 | Spivey . |
| 4,682,025 | 7/1987 | Livingston et al. . |
| 4,695,973 | 9/1987 | Yu . |
| 4,740,677 | 4/1988 | Carreras et al. . |
| 4,791,584 | 12/1988 | Greivenkamp et al. . |
| 4,833,314 | 5/1989 | Pepper et al. . |
| 4,865,454 | 9/1989 | Lazzarini et al. . |
| 4,943,709 | 7/1990 | Grinberg et al. . |
| 5,026,977 | 6/1991 | Hubbard, Jr. . |
| 5,042,949 | 8/1991 | Greenberg et al. . |
| 5,042,950 | 8/1991 | Salmon, Jr. . |
| 5,067,811 | 11/1991 | Ouchi ...................................... 356/121 |
| 5,113,282 | 5/1992 | O'Meara et al. . |
| 5,120,128 | 6/1992 | Ulich et al. . |
| 5,129,058 | 7/1992 | Mifune et al. . |
| 5,253,033 | 10/1993 | Lipchak et al. . |
| 5,276,737 | 1/1994 | Cohn . |
| 5,287,165 | 2/1994 | Ulich et al. .............................. 356/121 |
| 5,453,606 | 9/1995 | Hojo ..................................... 250/201.1 |

OTHER PUBLICATIONS

Giles, Michael K., "Applications of Programmable Spatial Light Modulators", *Society of Optical and Quantum Electronics*, 8 pp. (Dec. 2–6,1996).

Giles, Michael K., "The Liquid Crystal Television (LCTV) as an Optics Education Tool," SPIE vol. 252, pp. 87–93, 1995.

(List continued on next page.)

*Primary Examiner*—Anita Pellman Gross
*Assistant Examiner*—Kenneth Parker
*Attorney, Agent, or Firm*—Deborah A. Peacock; Jeffrey D. Myers

[57] ABSTRACT

An apparatus and method for characterizing light beam collimation and alignment. A liquid crystal device receiving a light beam from a collimation lens has a lenslet array generated thereon. A corresponding array of point spread functions are detected by a charge coupled device camera, from which light beam collimation and alignment are characterized. The data may be further used to adjust the collimation lens to correct misalignment.

18 Claims, 11 Drawing Sheets

OTHER PUBLICATIONS

Amako, Jun, et al., "Kinoform Using an Electrically Controlled Birefringent Liquid–Crystal spatial Light Modulator," *Applied Optics*, vol. 30, No. 32, pp. 4622–4628 (Nov. 10, 1991).

Konforti, N., et al., "Phase–only Modulation with Twisted Nematic Liquid–Crystal Spatial Light Modulators," *Optics Letters*, vol. 13, No. 3, pp. 251–253 (Mar. 1988).

Morozumi, S., et al., "Latest Developments in Liquid Crystal Television Displays," *Optical Eng.*, vol. 23, No. 3, pp. 241–246 (May/Jun. 1984).

Berreman, D.W., "Dynamics of Liquid–Crystal/Twist Cells, *Applied Physics Letters,*" vol. 25, No. 1, pp. 12–15 (Jul. 1, 1974).

Bonaccini, D., et al., "Adaptive Wavefront Corrector using Addressable Liquid Crystal Retarders," *SPIE, Current Developments in Optical Developments in Optical Engineering IV*, vol. 1334, pp. 89–97 (1990).

Bonaccini, D., et al., "Adaptive Optics Wavefront Corrector Unisgh Addrssable Liquid Crystal Retarders: II " *SPIE, Active and Adoptive Components*, vol. 1543, pp. 133–143 (1991).

Horwitz, B.A., et al., "Multiplex Techniques for Real–Time Shearing Interferometry," *Optical Engineering*, vol. 29, No. 10, pp. 1223–1232 (1990).

Kirsch, J.C., "Modulation Characteristics of the Epson Liquid Crystal Television," *Optical Engineering*, vol. 31, No. 5, pp. 963–967 (May 1992).

Roddier, F., "Variation on a Hartmann Theme," *Oprical Engineering*, vol. 29, No. 10, pp. 1239–1242 (Oct. 1990).

Thompson, L., A., "Adaptive Optics in Astronomy," *Physics Today*, pp. 24–31 (Dec. 1994).

Chapter from Textbook, 18.3 "Electro–Optics of Liquid Crystals," pp. 721–727.

CHARACTERIZATION OF COLLIMATION AND BEAM ALIGNMENT

CROSS-REFERENCE TO RELATED APPLICATIONS

This application is a continuation-in-part application of U.S. patent application Ser. No. 08/499,703, entitled *Adaptive Optics Wave Measurement and Corrective System*, to Rensheng Dou et al., filed on Jul. 7, 1995, and the specification thereof is incorporated herein by reference, now U.S. Pat. No. 5,684,545.

This application claims the benefit of the filing of Provisional application Ser. No. 60/011,544, entitled *Collimation and Beam Alignment Testing and Estimation Using LCTVs*, filed on Feb. 13, 1996, and the specification thereof is incorporated herein by reference.

BACKGROUND OF THE INVENTION

1. Field of the Invention (Technical Field)

The present invention relates to collimation and beam alignment methods and apparatuses and to liquid crystal devices ("LCTV's").

2. Background Art

Adaptive optics systems employing LCTV's include those described in Kirsch et al., "Modulation characteristics of the Epson liquid crystal television", *Optical Engineering* 31:5, pp. 963–967 (May 1992); Bonaccini et al., "Adaptive optics wavefront corrector using addressable liquid crystal retarders", *SPIE Current Developments in Optical Engineering IV* 1334, pp. 89–97 (Jan. 1990); Bonaccini et al., "Adaptive optics wavefront corrector using addressable liquid crystal retarders: II", *SPIE Active and Adaptive Optical Components* 1543, pp. 133–143 (Jan. 1991); U.S. Pat. No. 4,695,973, entitled "Real-Time Programmable Optical Correlator", to Yu (Sep. 1987); U.S. Pat. No. 4,943,709, entitled "Liquid Crystal Adaptive Optics System", to Grinberg et al. (Jul. 1990); U.S. Pat. No. 5,253,033, entitled "Laser Radar System with Phased-Array Beam Steerer", to Lipchak et al. (Oct. 1993); and U.S. Pat. No. 5,113,282, entitled "Dual Light Valve System with Selective Decoupling of Light Valves", to O'Meara et al. (May 1992). However, it is believed that no one has heretofore applied LCTV's to the problem of beam alignment and collimation.

SUMMARY OF THE INVENTION (DISCLOSURE OF THE INVENTION)

The present invention is of an apparatus for and method of characterizing light beam collimation and alignment, comprising: providing a liquid crystal device which receives a light beam from a collimation lens; generating a lenslet array on the liquid crystal device; detecting an array of point spread functions; and characterizing the light beam collimation and alignment from characteristics of the array of point spread functions. In the preferred embodiment, the liquid crystal device comprises an array of liquid crystal pixels, on which a lenslet array is generated by programming gray scale levels of the pixels to form a plurality of lenslets. A charge coupled device camera is used to detect the array of point spread functions. Characterization is by determining centroids of each point spread function and a centroid of the array of point spread functions. An angular misalignment is determined, which may be used to adjust the collimation lens to correct a misalignment after calculation of the desired translation of the collimation lens involving measuring distances between centroids of the point spread functions.

The invention is also of an apparatus for and method of three-dimensional optical microscopy with a vertical resolution of approximately five nanometers or better, comprising: providing a specimen; imaging the specimen through a microscope objective lens; providing the image to a closed loop adaptive optics system comprising a liquid crystal device, a charge coupled device, and a computer providing a video signal to the liquid crystal device; and generating by the computer an array of gray levels to reduce wavefront distortion from the image.

A primary object of the present invention is to provide an apparatus and method to test and estimate collimation and beam alignment and to obtain three-dimensional measurements of microscopic phase specimens using a liquid crystal device.

A primary advantage of the present invention is that it permits automation of the testing, estimation, and correction processes.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIGS. 6(*a*) and (*b*) illustrate the calculation of the angular misalignment;

FIGS. 12(*a*)–(*d*) illustrate the process of wavefront correction of a phase object: (a) interference fringes of the phase object, (b) interference pattern after correction by driving the LCTV, (c) computer-generated gray level pattern used to drive the LCTV pixels and correct the distortion, and (d) 3-D plot of the wavefront of the phase object using a 30×30 grid to represent the 1 cm² aperture.

DESCRIPTION OF THE PREFERRED EMBODIMENTS (BEST MODES FOR CARRYING OUT THE INVENTION)

The present invention is of an apparatus and method to test and estimate collimation and beam alignment using a liquid crystal device ("LCTV"). In this technique, a lenslet array is written on the LCTV using a computer program. The image formed by this array at a suitable distance is "grabbed" using a charge coupled device ("CCD") camera and processed using a centroid finding method. Experimentally, deviations from collimation and beam alignment at least as small as 10 micrometers may be detected. Using a LCTV, it is possible to obtain a nearly perfect collimation and beam alignment. The present invention may be used to achieve initial system collimation and/or alignment as well as as an aid in automating optical systems which are required to maintain constant collimation and beam alignment.

Epson liquid crystal devices obtained from an Epson Crystal Image Video Projector model 1020 are the preferred LCTV. The projector contains three thin film transistor LCTVs. Each LCTV has a 1.3 inch diagonal screen. This screen contains an array of 320×220 rectangular pixels, each having dimensions of 55×60 micrometers. Each pixel consists of a twisted nematic liquid crystal sandwiched between two glass plates. The brightness control can be adjusted to provide a bias voltage across the entire array of pixels, while the voltage across each individual pixel is modulated by the video signal received by the projector.

Figure 1:
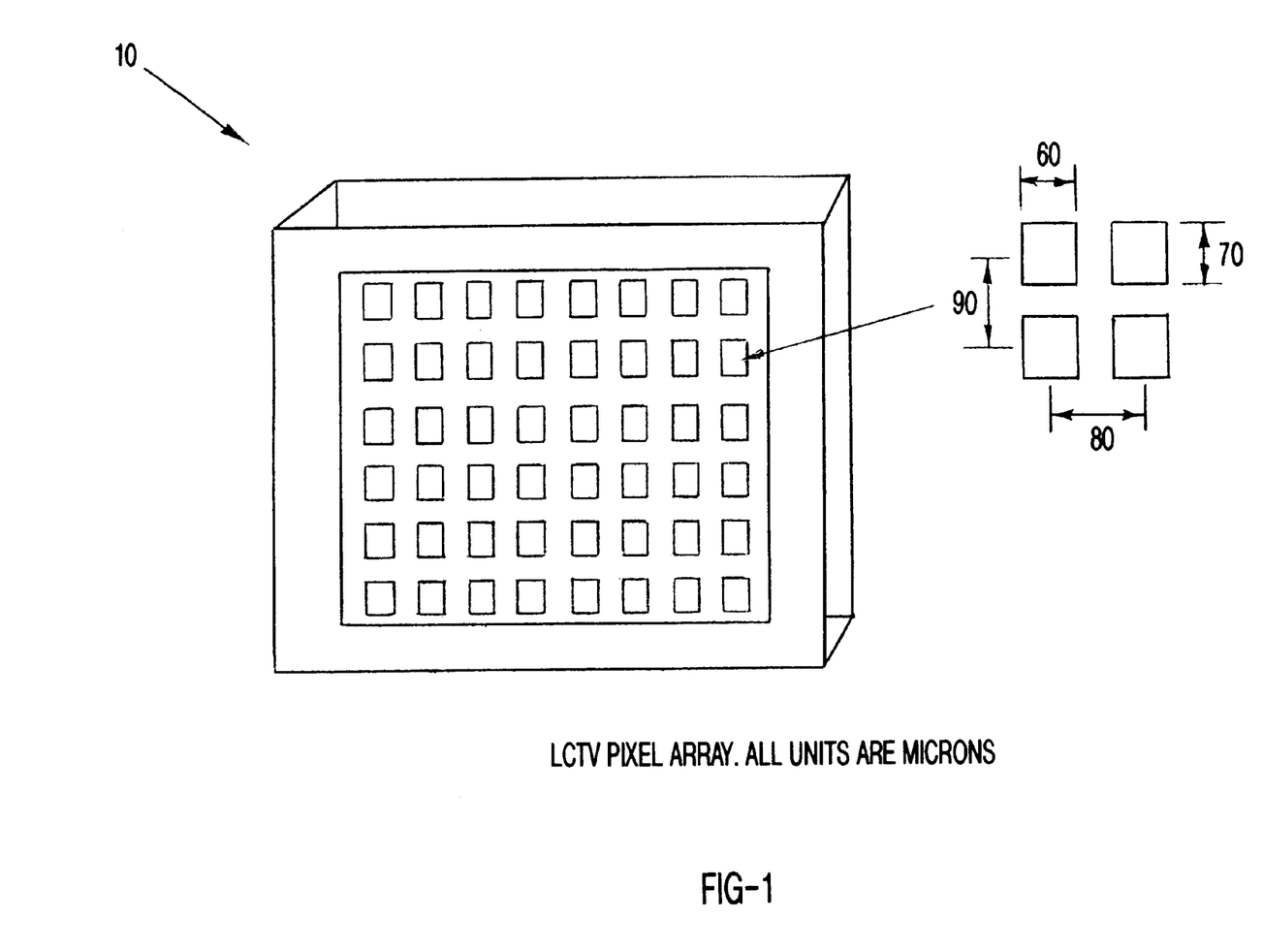
FIG. 1 shows the preferred pixel configuration of the liquid crystal device component of the invention.
Figure 2:
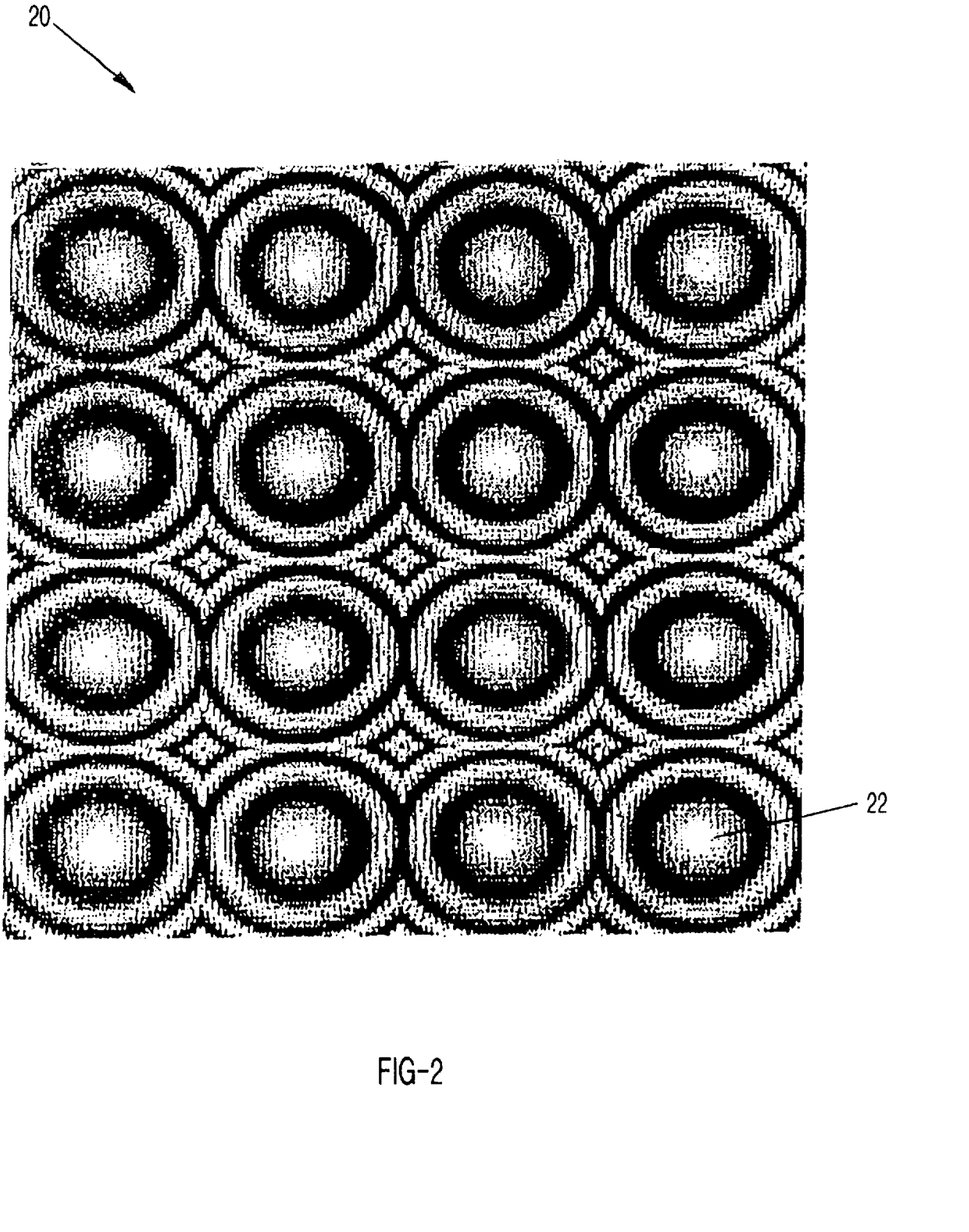
FIG. 2 illustrates a 4×4 lenslet array according to the invention with each lenslet having 32×32 pixels and a focal length of 50 cm.
Figure 3:
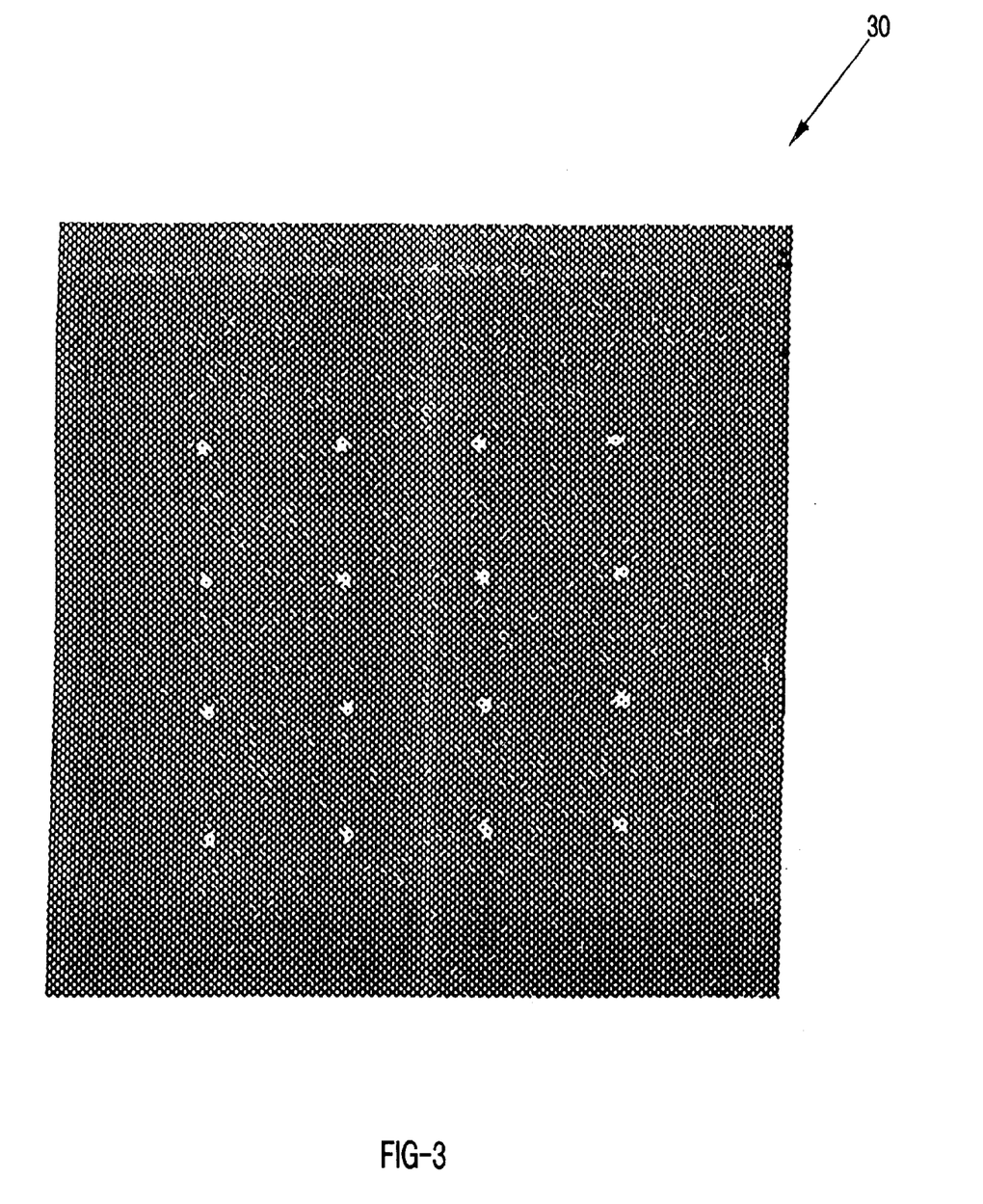
FIG. 3 illustrates the resulting point spread functions ("PSFs") of the lenslet array of FIG. 2 as collected by a charge coupled device ("CCD") camera and displayed on a video monitor.

FIG. 1 shows the preferred LCTV's pixel configuration 10 (units are in microns). FIG. 2 illustrates a 4×4 lenslet array 20 with each lenslet 22 having 32×32 pixels and a focal length of 50 cm. The resulting point spread functions 30 (PSFs) of each lenslet array are collected by a CCD camera and grabbed onto a video monitor as shown in FIG. 3. For the characterization of collimation and misalignment, it is necessary to evaluate centroids of each PSF as well as the entire pattern of the PSFs. This is next described.

Let W and H represent the width and height of the entire lenslet array in micrometers. Also, let W' and H' denote the width and height of each lenslet. The centroid of the (i,j)th lenslet is given by:

$$Cll_{(ij)} = [W'(i-\tfrac{1}{2}), H'(j-\tfrac{1}{2})], \quad (1)$$

and the centroid of the entire array is:

$$Cla = [W/2, H/2] \quad (2)$$

The acquired PSF is a spatially sampled 2-D signal with a uniform spacing over an interval of N pixels. For an ideal sampling gate profile, the centroid coordinates $(x_c, y_c)$ of each PSF that converges to zero within a finite interval is:

$$xc = \frac{\sum_{k=0}^{N-1}\sum_{l=0}^{N-1} k g_{(k,l)}}{\sum_{k=0}^{N-1}\sum_{l=0}^{N-1} g_{(k,l)}} \quad (3)$$

where i and j assume pixel numbers, and $g_{(ij)}$ represents the sampled PSF. The centroid of the entire PSF pattern, $(X_c, Y_c)$ can be obtained by:

$$Xc = \frac{1}{ab}\sum_{i=1}^{a}\sum_{j=1}^{b} xc_{(i,j)} \quad (4)$$

$$Yc = \frac{1}{ab}\sum_{i=1}^{a}\sum_{j=1}^{b} yc_{(i,j)}$$

where a=number of PSFs along the ith row; b=number of PSFs along the jth row;

$x_{c(i,j)}$=x-centroid of the $ij^{th}$ PSF; and $y_{c(i,j)}$=y-centroid of the $ij^{th}$ PSF. Eqn. 4 represents the "centroid of centroids" of the PSF pattern produced by the lenslet array. The width and height of an entire grabbed PSF array can be obtained by averaging centroids of each side. After appropriate weighting in the case in which the number of addressed pixels on the LCTV is not equal to that of digitized pixel array, the width and height of the entire PSF array are denoted by Wpsf and Hpsf. The difference in dimensions of lenslet array and PSF array, δW and δH, characterize the collimation, and the difference in their centroids characterizes the misalignment.

Figure 4:
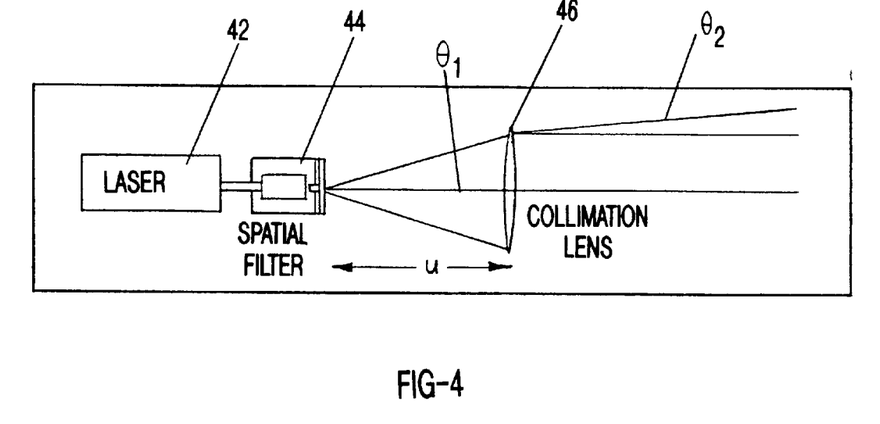
FIG. 4 illustrates the relation of exit angle $\theta_2$ to $\theta_1$, the half angle of the input cone of light.

In a typical collimation unit consisting of a converging lens separated from a spatial filter by a distance equal to its focal length, f, a diverging cone of light from the spatial filter is converted into a beam whose rays are parallel to the optic axis at the lens. In FIG. 4, showing laser 42, spatial filter 44, and collimation lens 46, exit angle $\theta_2$ is related to $\theta_1$, the half angle of the input cone of light, by:

$$\theta_2 = \mathrm{atan}[(u/f)-1)\tan(\theta_1)] \quad (5)$$

Figure 5:
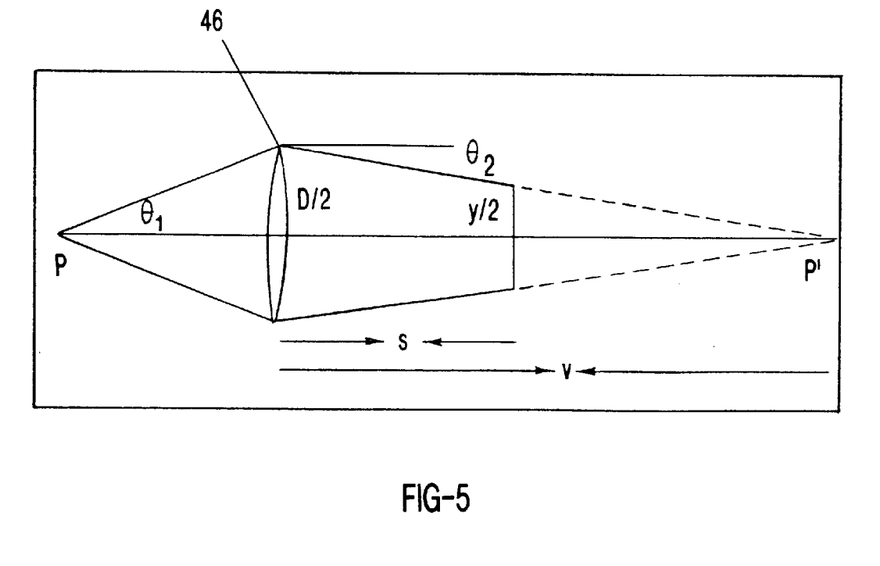
FIG. 5 illustrates relation of P', the image of the point source, P, at a distance v from a lens.

In Eqn. 5, u is the distance of lens from spatial filter and $$\theta_1 = \mathrm{atan}(D/2u) \quad (6)$$

where D is the beam diameter at the lens. From Eqn. 5, when u=f, $\theta_2$=0, implying perfect collimation. Although $\theta_2$ can be considered as measure of collimation, its determination is practically difficult. Because perfect collimation implies that the size of a beam is invariant with distance from the lens, it would be advantageous to write $\theta_2$ in terms of beam size, y, formed at a distance s from the center of lens. From FIG. 5, if P' is the image of the point source, P, at a distance v from lens 46, then:

$$\tan(\theta_2) = (y/2)/(v-s). \quad (7)$$

Using Eqn. 6 and the lens equation, (1/u)+(1/v)=(1/f), together with Eqn. 7, one gets:

$$y = \frac{2}{f}\tan(\theta_1)[f(u+s) - us]. \tag{8}$$

To obtain a relation for y when the lens is translated a distance, $\Delta z$, we proceed as follows. As $\theta_1$ is also difficult to measure, substituting for $\tan(\theta_1)$ from Eqn. 6 and writing $u=f+\Delta z$ in Eqn. 8, one gets:

$$y=[D/f(f+\Delta z)][f^2+\Delta z(f-s)]. \tag{9}$$

Simplifying Eqn. 9 further, one obtains:

$$y=D[1-(\Delta z\, s)/(f^2+f\,\Delta z)]. \tag{10}$$

Although in Eqn. 10 it appears that D is not an easily measurable quantity, its value is fixed by the size of lenslet array addressed on the LCTV and is proportional to the size of the PSF array. D and y can be conveniently measured in terms of the distances between the centroids of the desired lenslets. If y is computed using a centroid finding algorithm, a corresponding translation, $\Delta z$, to be applied for achieving the best possible collimation can be obtained from Eqn. 10. This technique is useful in the development of automated optical systems.

Figure 6:
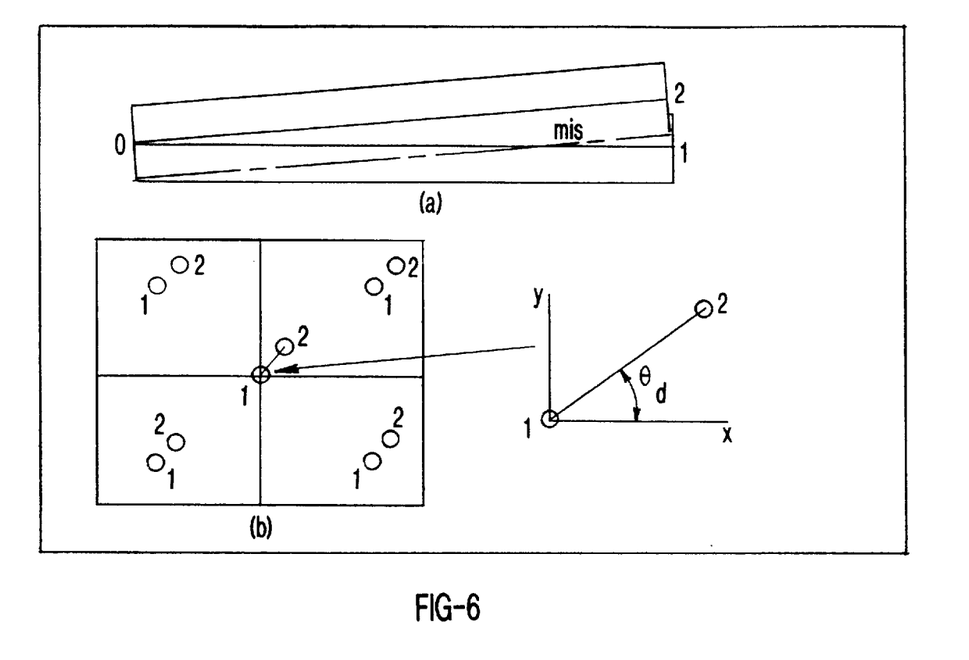

The necessity of aligning the collimated laser beam along a desired axis assumes significance in many applications. Referring to FIG. 6(a), with respect to a known reference coordinates, $(X_r, Y_r)$, the angular misalignment is given by:

$$\theta_{mis} = a\tan\left[\frac{\sqrt{(X_c^2 - X_r^2)^2 + (Y_c^2 - Y_r^2)^2}}{d}\right] \tag{10}$$

where d is the distance between the LCTV and the CCD array. In the case when $(X_r, Y_r)$ is not known, one can write for two positions, $d_1$ and $d_2$ of the collimation lens, $$\theta_{mis} \cong a\tan\left[\sqrt{\frac{(M_2^2 - M_1^2)}{(d_2^2 - d_1^2)}}\right]$$

where $$M_1 = \sqrt{(X_{c1}^2 + Y_{c1}^2)} \text{ and } M_2 = \sqrt{(X_{c2}^2 + Y_{c2}^2)}.$$

Referring to FIG. 6(b), by writing $\theta_d$ as:

$$\theta_d = a\tan\sqrt{\frac{(Y_{c2} - Y_{c1})}{(X_{c2} - X_{c1})}} \tag{11}$$

the exact quadrant can be determined from the conditions given in Table 1.

TABLE 1

| | | |
|---|---|---|
| $X_{c2} \geq X_{c1}$ and $Y_{c2} \geq Y_{c1}$ | $\theta_d$ is positive | $0 \leq \theta_d < 90°$ |
| $X_{c2} \leq X_{c1}$ and $Y_{c2} \geq Y_{c1}$ | $\theta_d$ is negative | $90 \leq \theta_d < 180°$ |
| $X_{c2} \leq X_{c1}$ and $Y_{c2} \leq Y_{c1}$ | $\theta_d$ is positive | $180 \leq \theta_d < 270°$ |
| $X_{c2} \geq X_{c1}$ and $Y_{c2} \leq Y_{c1}$ | $\theta_d$ is negative | $270 \leq \theta_d < 360°$ |

$(X_{c1}, Y_{c1})$ can be either recognized as $(X_r, Y_r)$ or the centroid coordinates of the PSF array at the best possible collimation.

Figure 7:
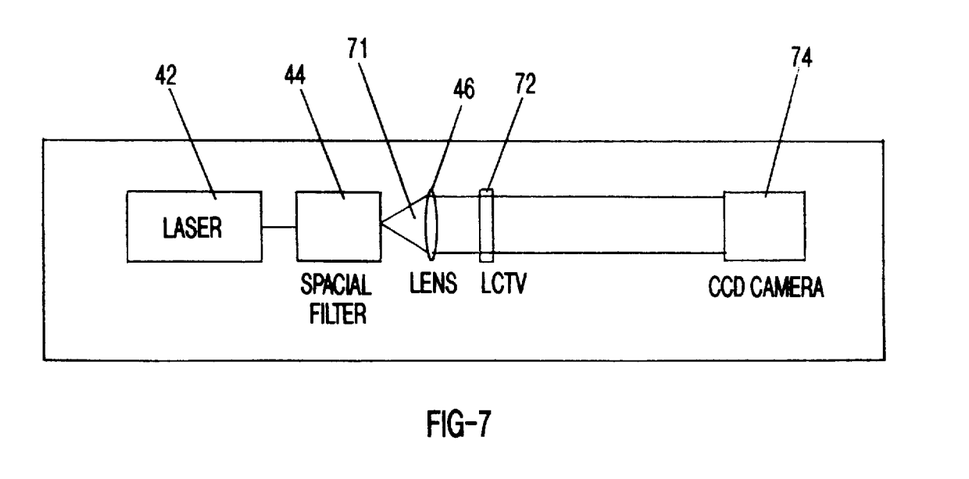
FIG. 7 schematically illustrates the preferred apparatus of the invention.

FIG. 7 schematically illustrates the preferred apparatus of the invention. The spatially filtered laser beam 71 (preferably HeNe) is incident on a collimation lens 46 that can be manually translated along a rail. The PSF array produced by the LCTV 72 on the monitor of a CCD camera 74 is grabbed on to a second monitor for further processing. The collimation lens is translated in steps of about 1 mm and the centroids of each PSF as well as the entire PSF array is obtained using a C language program or the like in conjunction with an image processing software known as PCIP. The centroid finding method provides a minimum resolution of 0.1 pixel which corresponds approximately to 9 microns. The dimensions of the lenslet array written on the LCTV is 128×128 pixels with each lenslet size being 32×32 pixels. For perfect collimation, the centroids of PSFs have to be separated by 32 pixels along x and y directions. Since the displayed image from the CCD camera is disproportionately larger than the actual image, the camera is best positioned to collect only the middle four PSFs. The scale factors for height and width have to be determined for a given imaging system. In the present instance case, the heighth and width of the PSF array were appropriately scaled down by dividing them by 4.81 and 4.65, respectively.

Figure 8:
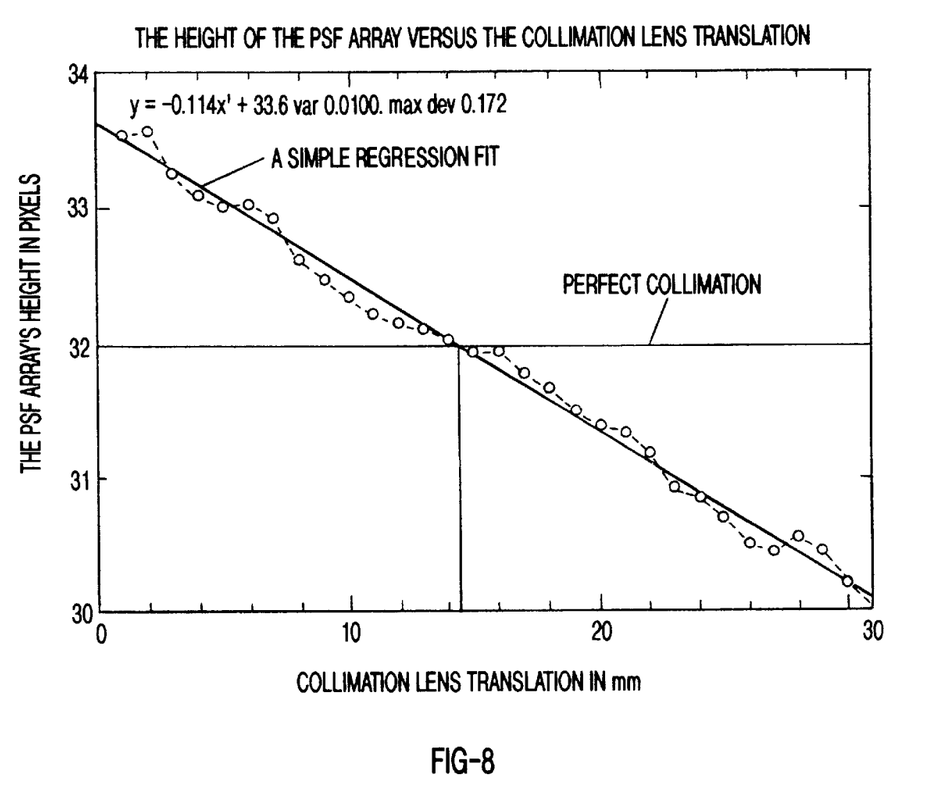
FIGS. 8 and 9 is a graph of the variation of the width and height of the PSF array versus the translation of the collimation lens.
Figure 9:
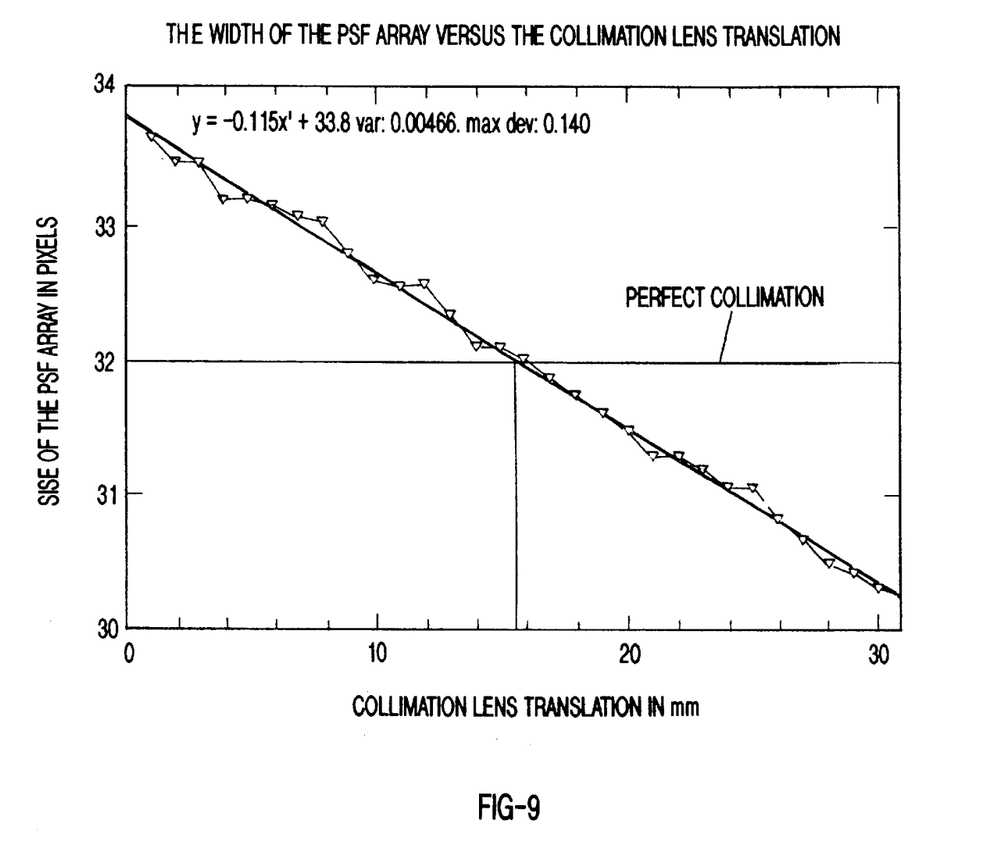
Figure 10:
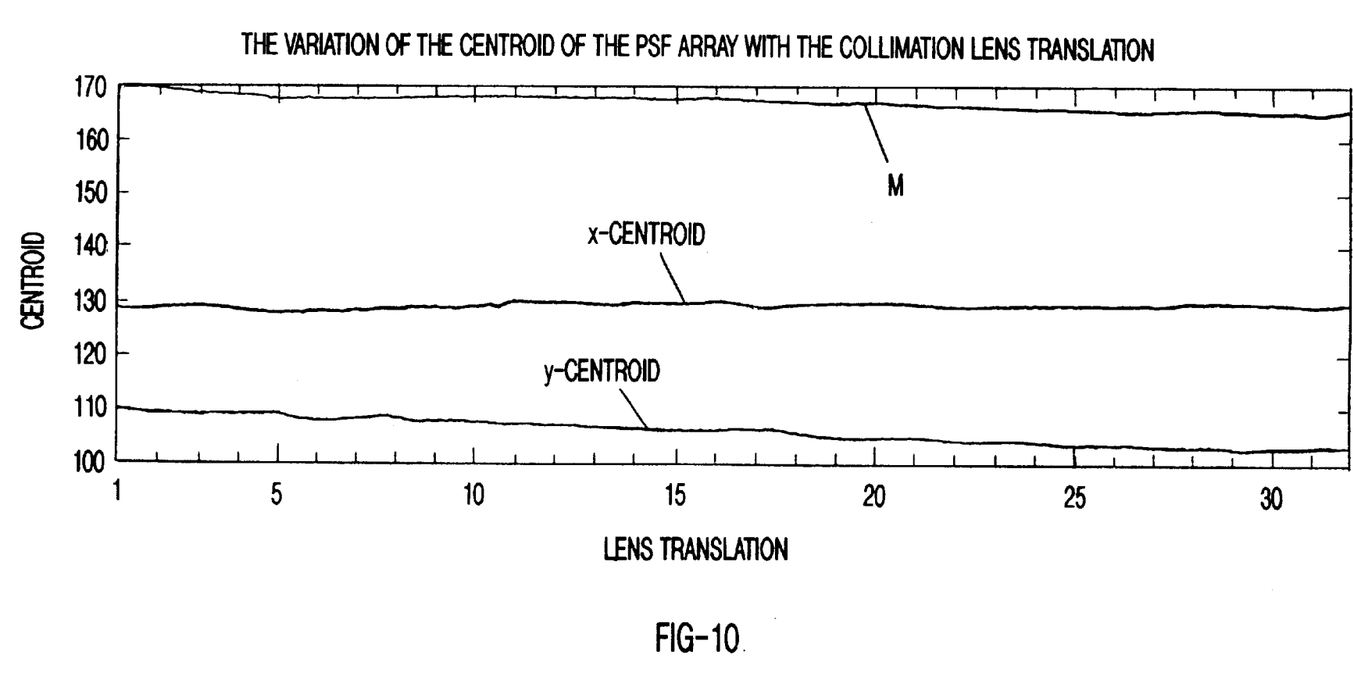
FIG. 10 illustrates the almost linear dependence of the centroid coordinates of the entire PSF array on the collimation lens translation.

In FIGS. 8 and 9, the variation of the width and height of the PSF array versus the translation of the collimation lens are shown. The smoothness of these collimation curves is affected by several factors including the variations due to manual translation and imperfections present in the rail and mounts. A simple regression fit indicates that the collimation curves are linear. Corresponding to 32 pixel width, the lens position for the best collimation is determined. For automation purposes, the equations of the collimation curves are preferably encoded using a microprocessor to drive a suitable high resolution stepper motor for translation of the collimation lens. FIG. 10 illustrates the almost linear dependence of the centroid coordinates $(X_c, Y_c)$ of the entire PSF array and $M=\sqrt{(X_c^2+Y_c^2)}$ on the collimation lens translation. For $(X_c, Y_c)=(0,0)$, the angular misalignment can be obtained from the slope of the M-curve. From FIG. 10, $\theta_{mis}$ is determined to be equal to 91.6 mrad and the centroid of the PSF array makes an angle of 40 degrees in the plane of the CCD array. The beam size and angular misalignment values may be used to drive a Proportional-Integral-Derivative (PID) or fuzzy logic based controller to adjust the collimation lens position in order to acheive the best possible collimation.

LCTVs are versatile devices which are electrically addressable to function as programmable optical elements. By writing a lenslet array on the LCTV, the resulting PSF array can be used to characterize the laser beam collimation and alignment. By tracking the height and width of the PSF array, the collimation lens position can be adjusted to obtain the best possible collimation. In addition, the angular misalignment can be estimated. The size of a collimated beam has to be invariant over a desired distance. By writing a programmable lenslet array on a LCTV and using a suitable centroid finding algorithm, beam size variations of about 10 micrometers and minimum deviation in the beam alignment of 20 microradians can be detected. The pixel sizes of the LCTV and CCD array are the main factors that limit the attainable resolution. A main advantage of the present technique is that it is amenable for automation in real time and hence useful for autocorrection of collimation and beam alignment in the optical systems prone to disturbances.

The present invention is also of optical microscopy capable of achieving a vertical resolution on the order of one percent of a wavelength, or about 5 nanometers. This microscopy method employs a liquid crystal wavefront correction device and the interferometric measurement techniques used in atomic force microscopes and scanning tunneling microscopes. Applications include highly sensitive optical sensing of biochip data, measurement of the absolute thickness of microbiological specimens, precise refractive index measurements of cell components, and simplified measurement of protein concentrations on the surfaces of cell sections.

Figure 11:
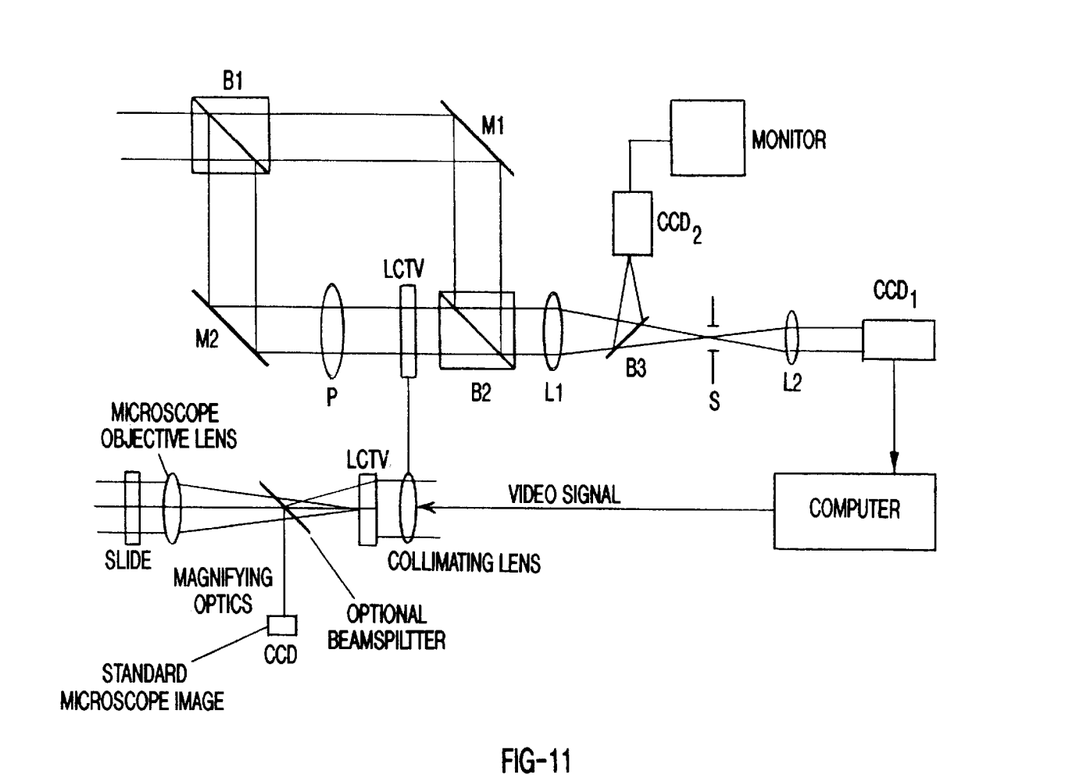
FIG. 11 illustrates the preferred microscopy embodiment of the invention.
Figure 12:
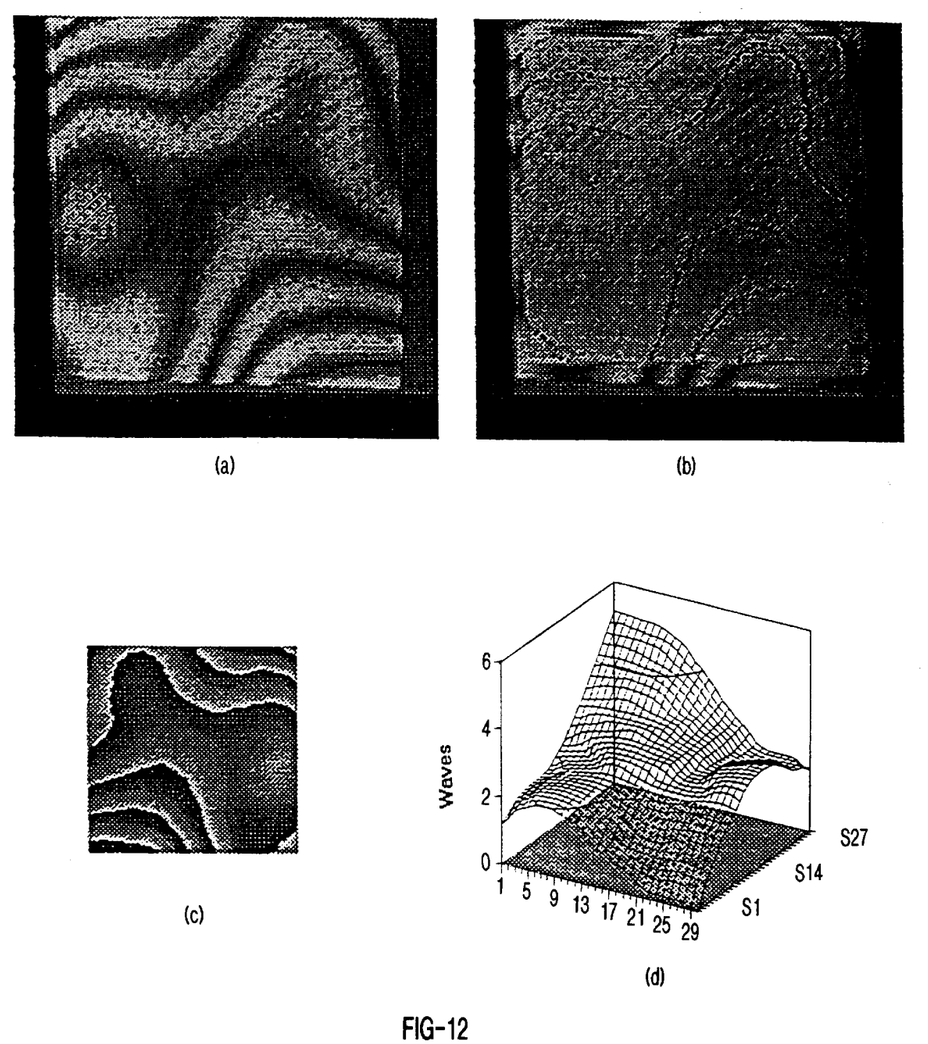
Figure 13:
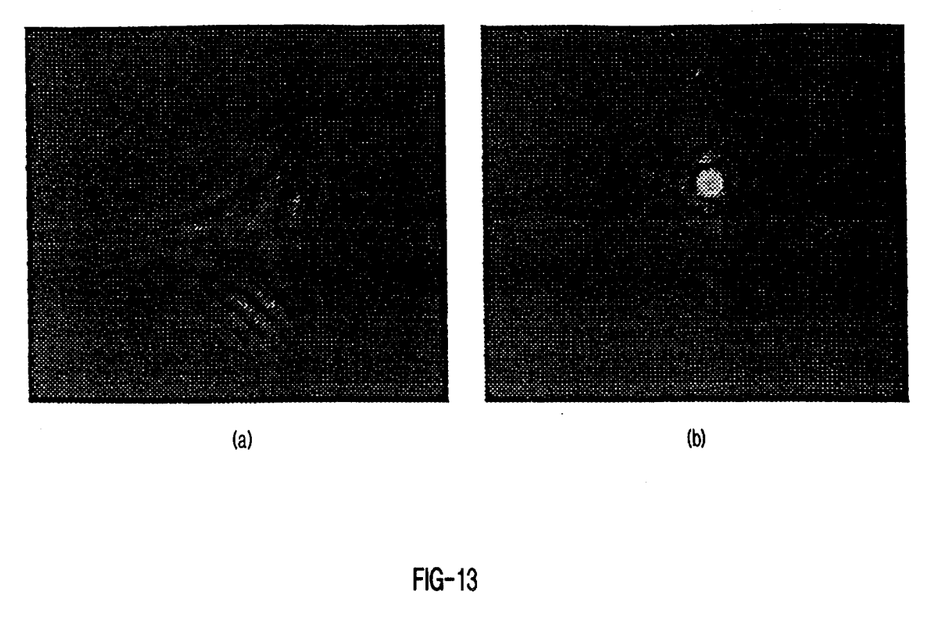
FIGS. 13(a)–(b) illustrate point images of the measured wavefront: (a) before correction, and (b) after correction.

This aspect of the invention is based on the wavefront measurement technology described in U.S. patent application Ser. No. 08/499,703 that corrects optical wavefront distortions using a phase-modulated liquid crystal device and a feedback loop, so that the original distortion is then represented by the array of pixel voltages necessary to remove the distortion. At least 256 distinct phase shift levels are possible, and so phase information is accurate to about 0.004 wavelength. A block diagram of the preferred microscopy system is shown in FIG. 11. B1, B2, and B3 are three beam splitters; M1 and M2 are two mirrors; L1 and L2 are two lenses; P is a phase object; S is a spatial filter; $CCD_1$ and $CCD_2$ are CCD cameras used to detect the interference pattern and point image, respectively. The magnifying components of the invention are placed in the bottom path of the Mach-Zehnder interferometer with the slide containing the specimen indicated by phase object P. In the microscope, the specimen will be magnified and imaged on the LCTV which is imaged on $CCD_1$. The specimen can also be imaged on a separate camera using another beam-splitter placed in front of the LCTV to produce a traditional bright field image (or a phase contrast image) so that computer generated overlays of different types of specimen data can be studied by scientists using the instrument. The LCTV aperture is reduced to a 1 cm square containing the central 128×128 pixels. A phase object P inserted in front of the LCTV distorts the wavefront in the bottom path and produces the interference pattern shown in FIG. 12(a) as it interferes with the reference beam that passes through the top path of the interferometer. The interference pattern after correction is shown in FIG. 12(b), and FIG. 12(c) shows the array of gray levels used to drive the pixels of the LCTV and remove the distortion. These gray levels are used to calculate the phases at each position of the distorted wavefront and to produce the wavefront phase map shown in FIG. 12(d). The dark points and lines in FIG. 12(b) for the fringe pattern after correction are due to a slight horizontal spatial misregistration of the LCTV pixels and the computer generated pixels placed on the LCTV to correct the phase errors. This error is very small, and may be corrected by using LCTV devices with individually addressable pixels in both dimensions. FIG. 13 shows the point image or point spread function produced by focusing the measured wavefront. FIG. 13(a) gives a dispersed pattern which shows the point spread function of the seriously distorted wavefront before the correction, and FIG. 13(b) shows the point spread function after correction which is close to the diffraction limit, confirming the effectiveness of the method.

The biological science will benefit from the present invention. A microscope equipped with a full-aperture wavefront measurement system will be able to measure with unprecedented speed and precision the point-to-point variations in the optical properties and thickness of microorganisms. It can identify internal structures of cells according to their refractive index. The new technique should be a particular boon to microscopists studying protein distribution in cells. Current state-of-the-art methods involve fixing a specimen, sectioning it, binding gold-tagged antibodies to the proteins of interest that are exposed on the surface, and depositing silver onto the gold particles to build up an opaque layer. The new microscopy should make the silver deposition step unnecessary, since it should be sensitive enough to measure the thickness of the gold-tagged antibody layer alone.

The present invention is further of techniques for further improving wavefront measurement and correction systems. These are as follows:

1. Programmable pupil generation. A phase lens function may be written on an LCTV and then used as an imaging lens in a coherent or incoherent system. The focal length of this lens can be changed rapidly by writing a new lens function to the LCTV, making it useful as an autofocus system. Similarly, various lens aberrations can be written to the lens so that it becomes a programmable aberrated wavefront generator which can be used as an educational tool or as a programmable testing or wavefront correcting system.

2. Real-time laser (or other light) beam deflection and scanning. Coarse scanning is accomplished by moving a phase lens pattern around on the phase-mode LCTV, and fine scanning is done by writing the appropriate tilt pattern on the LCTV.

3. Image and/or laser beam tracking, pointing, and stabilization by driving the scanner with feedback error signals obtained from a CCD camera/computer used to monitor the image position.

4. Wavefront measurement of a laser diode output beam to determine beam quality.

5. Wavefront correction of a laser diode output beam to improve beam quality and/or shape the beam to a specified shape, divergence, and/or beam quality. For example, an anamorphic lens written on an LCTV can change the beam shape from elliptical to circular while simultaneously correcting aberrations in the beam.

6. Hartmann wavefront sensing using an array of tiny lenses (lenslets) written on the LCTV.

7. Scanning Hartmann wavefront sensing using a single scanned tiny lens to increase the measurement resolution across the wavefront when compared to a fixed array of lenslets with space between them.

8. Measurement of focus, astigmatism and other errors in the human eye. In this case, the eye is the optical component being tested in a variation of the original interferometric setup.

9. Inspection of precision optical components such as laser rods or optical crystals in order to detect distortions in the components.

10. High precision wavefront correction or generation using the embodiment of U.S. patent application Ser. No. 08/499,703 in a separate self-monitoring optical path that is continuously self-correcting (via feedback) to remove the effects of variations in the phase of the LCTV pixels due to changes in temperature, pressure, or other factors. In this case, the feedback obtained from intensity measurements of the laser beam interference fringes in the original embodiment are used to improve the precision of corrections introduced by the LCTV to a wavefront (derived, for example, from an incoherent telescope) whose optical path is completely separate and passes through the LCTV at a different angle than that of the laser beam. The necessary phase corrections written on the LCTV are obtained from a separate wavefront sensor in the telescope. The distinguishing characteristic of this embodiment is the use of the original adaptive optics system to obtain high precision wavefront correction or generation using an LCTV. It is important because the phase characteristics of the LCTV vary with environmental factors such as temperature, but the adaptive feedback embodiment automatically removes the effects of these undesirable variations.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of characterizing light beam collimation and alignment, the method comprising the steps of:
    a) providing a liquid crystal device which receives a light beam from a collimation lens;
    b) generating a lenslet array on the liquid crystal device;
    c) detecting an array of point spread functions produced by the lenslet array; and
    d) characterizing the light beam collimation and alignment from characteristics of the array of point spread functions.

2. The method of claim 1 wherein providing a liquid crystal device comprises providing a liquid crystal device comprising an array of liquid crystal pixels.

3. The method of claim 2 wherein generating a lenslet array comprises programming gray scale levels of the pixels to form a plurality of lenslets.

4. The method of claim 1 wherein detecting an array of point spread functions comprises providing a charge coupled device camera.

5. The method of claim 1 wherein characterizing the light beam collimation and alignment comprises determining centroids of each point spread function and a centroid of the array of point spread functions.

6. The method of claim 1 wherein characterizing the light beam collimation and alignment comprises calculating an angular misalignment.

7. The method of claim 1 additionally comprising the step of adjusting the collimation lens to correct a misalignment.

8. The method of claim 1 wherein adjusting the collimation lens comprises calculating a desired translation of the collimation lens.

9. The method of claim 8 wherein calculating a desired translation of the collimation lens comprises measuring distances between centroids of the point spread functions.

10. An apparatus for characterizing light beam collimation and alignment, said apparatus comprising:
    a liquid crystal device which receives a light beam from a collimation lens;
    means for generating a lenslet array on said liquid crystal device;
    means for detecting an array of point spread functions produced by said lenslet array; and
    means for characterizing the light beam collimation and alignment from characteristics of said array of point spread functions.

11. The apparatus of claim 10 wherein said liquid crystal device comprises an array of liquid crystal pixels.

12. The apparatus of claim 11 wherein said means for generating a lenslet array comprises means for programming gray scale levels of said pixels to form a plurality of lenslets.

13. The apparatus of claim 10 wherein said means for detecting an array of point spread functions comprises a charge coupled device camera.

14. The apparatus of claim 10 wherein said means for characterizing the light beam collimation and alignment comprises means for determining centroids of each point spread function and a centroid of said array of point spread functions.

15. The apparatus of claim 10 wherein said means for characterizing the light beam collimation and alignment comprises means for calculating an angular misalignment.

16. The apparatus of claim 10 additionally comprising means for adjusting said collimation lens to correct a misalignment.

17. The apparatus of claim 16 wherein said means for adjusting said collimation lens comprises means for calculating a desired translation of said collimation lens.

18. The apparatus of claim 17 wherein said means for calculating a desired translation of said collimation lens comprises means for measuring distances between centroids of said point spread functions.

* * * * *

UNITED STATES PATENT AND TRADEMARK OFFICE
CERTIFICATE OF CORRECTION

PATENT NO. : 5,978,053
DATED : November 2, 1999
INVENTOR(S) : Michael K. Giles, et al.

It is certified that error appears in the above-identified patent and that said Letters Patent is hereby corrected as shown below:

Replace Sheet 9 of 11 in Letters Patent with the attached corrected Fig-11.

Signed and Sealed this

Twenty-seventh Day of November, 2001

Attest:

*Nicholas P. Godici*

NICHOLAS P. GODICI
*Acting Director of the United States Patent and Trademark Office*

*Attesting Officer*